United States Patent [19]

Bisset

[11] 4,233,741
[45] Nov. 18, 1980

[54] MAP READING DEVICE

[75] Inventor: Claude O. Bisset, Johannesburg, South Africa

[73] Assignee: Hausler Scientific Instruments (Proprietary) Limited, Transvaal, South Africa

[21] Appl. No.: 30,488

[22] Filed: Apr. 16, 1979

[30] Foreign Application Priority Data

Apr. 17, 1978 [ZA] South Africa .................. 78/2179

[51] Int. Cl.³ ............................................. G01B 3/56
[52] U.S. Cl. ...................................... 33/1 N; 33/1 C; 33/403; 33/488; 362/26
[58] Field of Search ............... 33/1 C, 1 N, 403, 488, 33/1 B; 362/26, 31, 84, 34; 58/50 R

[56] References Cited

U.S. PATENT DOCUMENTS

| 1,087,751 | 2/1914 | Ferraris | 33/403 |
| 1,961,500 | 6/1934 | Larson | 33/1 N |
| 2,011,282 | 8/1935 | Hochman | 33/1 N |
| 2,424,065 | 7/1947 | Stewart | 33/1 N |
| 2,561,885 | 7/1951 | Prideaux et al. | 362/26 X |
| 3,474,538 | 10/1969 | Kirkegaard | 33/1 B |
| 3,841,083 | 10/1974 | Bergey | 58/50 R |
| 4,075,467 | 2/1978 | Peterson | 362/31 |

FOREIGN PATENT DOCUMENTS 1004710  9/1965  United Kingdom .

Primary Examiner—William D. Martin, Jr.
Attorney, Agent, or Firm—Schwartz, Jeffery, Schwaab, Mack, Blumenthal & Koch

[57] ABSTRACT

The device has a semi-circular housing 10 defined by a linear wall 14 and an arcuate wall 12, with an inturned edge 13, 15 on one side of the housing. Beta light strips 18 are located in the recess beneath the edges 13, 15 so that graduations on the internal walls of the housing can be viewed at night through an opening 16 in the housing.

4 Claims, 2 Drawing Figures

4,233,741

MAP READING DEVICE

BACKGROUND OF THE INVENTION

This invention relates to a device for facilitating the reading of maps and its object is to provide such a device by means of which a map may be read in the dark without using external illumination. The device also permits bearings and distances to be plotted.

SUMMARY OF THE INVENTION

A map reading device according to the invention comprises a housing having a viewing opening therein, the housing being provided with at least one Beta light arranged to illuminate the viewing opening.

Preferably the housing is semi-circular with at least one of, and preferably both of, the linear portion and arcuate portion having graduations.

Beta light is a trademark of Saunders-Roe Development Ltd. for a micro light comprising a luminescent tube excited by a radioactive gas, specifically tritium. Such Beta lights are commercially available.

BRIEF DESCRIPTION OF THE DRAWING

An embodiment of the invention is described hereunder with reference to the accompanying drawings in which.

PREFERRED DESCRIPTION OF THE EMBODIMENT

Figure 1:
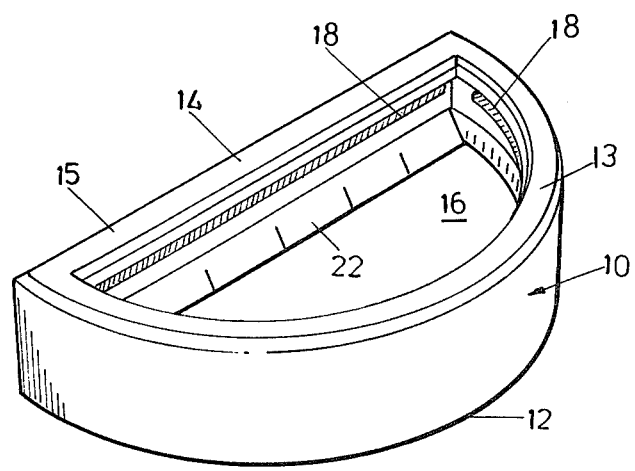
FIG. 1 is a perspective view of a map reading device of the invention.
Figure 2:
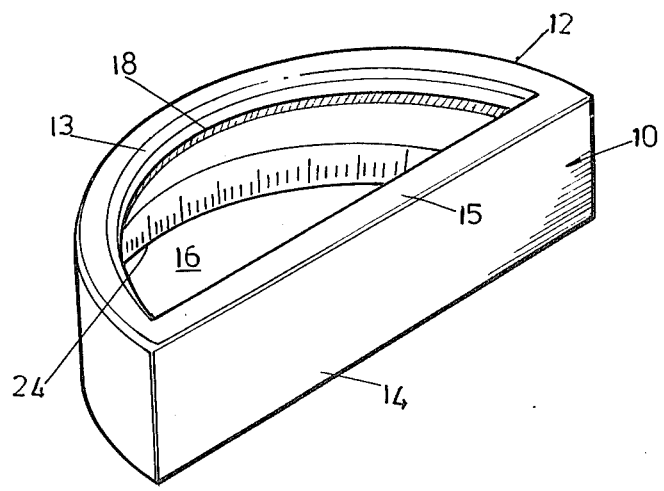
FIG. 2 is another view of the map reading device from the opposite direction to that shown in FIG. 1.

With reference to the drawings the map reading device of the invention comprises a semi-circular housing 10 having an arcuate wall 12 and a straight wall 14. Along one side of the housing each wall 12,14 has an inwardly turned edge portion 13, 15, respectively.

The housing is open inside the walls 12 and 14 to provide a viewing opening 16.

Tubes 18 containing Beta lights are located in the recess defined by the edges 13,15 of each of the sides 12 and 14 so as to be located around the viewing opening 16. The edge portions extend inwardly and downwardly over the tubes 18 so that the tubes are partially concealed.

The inner lower edge 22 of the straight side 14 is formed as a ramp and is calibrated, such as in kilometers or the like, to provide a distance scale, whereas the inner lower edge 24 of the semi-circular side 12, which is also formed as a ramp, is calibrated in degrees or mils to permit measurement of angles.

A notch (not shown) may also be provided at the mid point of the inner lower edge 22 of the straight side 14 to enable the device to be rotated about its centre with the aid of a pointed instrument so that a 360° reading may be obtained.

In use, the Beta lights provide sufficient illumination in the dark to enable any map to be read simply by placing the device on the map so that the part of the map inside the viewing opening is illuminated.

The Beta lights are concealed from external observers by means of the shrouds and the walls of the device.

I claim:

1. A map reading device comprising:
   (a) a housing open at the top and bottom, and enclosed by a semicircular wall and a straight wall;
   (b) inwardly projecting ledges on top of the walls;
   (c) graduation marks on the inside of at least one of the walls; and
   (d) a luminescent tube excited by a radioactive gas secured under at least one of the ledges.

2. A device as claimed in claim 1, in which the straight wall is provided with a central graduation mark and the semicircular wall with angular graduation marks.

3. A device as claimed in claim 1 wherein said gas is tritium.

4. A map reading device comprising:
   (a) a housing open at the top and the bottom, defined by a semicircular wall and a straight wall;
   (b) inturned edges on the top of said walls forming recesses;
   (c) tritium-powered microlight containing tubes secured in the recesses defined by said inturned edges and the inside of said walls;
   (d) an inclined portion formed on the internal walls of said housing, said inclined portion adapted to be illuminated by said micro lights;
   (e) angular graduations on the inclined portion of said semicircular wall; and
   (f) a central graduation mark on the inclined portion of said straight wall.

* * * * *